United States Patent [19]
Bump et al.

[11] Patent Number: 5,911,238
[45] Date of Patent: Jun. 15, 1999

[54] THERMAL MASS FLOWMETER AND MASS FLOW CONTROLLER, FLOWMETERING SYSTEM AND METHOD

[75] Inventors: Scott S. Bump, Plymouth Meeting; Gary P. Campbell, Hatifled; Joseph C. Dille, Telford, all of Pa.

[73] Assignee: Emerson Electric Co., St. Louis, Mo.

[21] Appl. No.: 08/725,859

[22] Filed: Oct. 4, 1996

[51] Int. Cl.$^6$ .................................................. F16K 31/12
[52] U.S. Cl. .................... 137/487.5; 137/486; 73/204.15
[58] Field of Search ................................ 137/487.5, 486; 73/861, 204.15, 204.16, 3

[56] References Cited

U.S. PATENT DOCUMENTS

| | | | |
|---|---|---|---|
| 4,253,156 | 2/1981 | Lisie et al. | 73/861 |
| 4,315,523 | 2/1982 | Mahawili et al. | 137/487.5 |
| 4,589,440 | 5/1986 | Panet | 137/486 |
| 4,796,651 | 1/1989 | Ginn et al. | 137/487.5 |
| 4,918,995 | 4/1990 | Pearman et al. | 73/861.02 |
| 5,003,810 | 4/1991 | Jepson et al. | 73/3 |
| 5,062,446 | 11/1991 | Anderson | 137/468 |
| 5,129,418 | 7/1992 | Shimomura | 137/486 |
| 5,285,673 | 2/1994 | Drexel et al. | 73/204.16 |
| 5,311,762 | 5/1994 | Drexel | 73/3 |
| 5,325,705 | 7/1994 | Tom | 73/31 |
| 5,359,878 | 11/1994 | Mudd | 73/204.15 |
| 5,445,035 | 8/1995 | Delajoud | 73/861 |
| 5,583,282 | 12/1996 | Tom | 73/31 |

FOREIGN PATENT DOCUMENTS

| | | | |
|---|---|---|---|
| 0 468 793 A2 | 1/1992 | European Pat. Off. | G01F 15/02 |
| 0 689 040 A2 | 12/1995 | European Pat. Off. | G01F 25/00 |
| 87/00267 | 1/1987 | WIPO | G01C 25/00 |

OTHER PUBLICATIONS

Sheriff, D., "Mass Flow Controller Features Digital Calibration," Solid State Technology, vol. 36, No. 2, pp. 33–34, 36, Feb. 1993.

Drexel, C.F., "Digital Mass Flow Controller," Solid State Technology, vol. 36, No. 6, pp. 73 and 75, Jun. 1993.

"Sensors Offer Fast Response Times—Thermal Mass-Flow Transducers," EDN Electrical Design News, vol. 34, No. 11, pp. 55, 57–58, 60, 62, 64, 66, 68, May 1989.

*Primary Examiner*—Denise L. Ferensic
*Assistant Examiner*—Joanne Y. Kim
*Attorney, Agent, or Firm*—Arnold, White & Durkee

[57] ABSTRACT

A flowmeter (100) or mass flow controller (101) used in a manufacturing process with toxic and reactive process fluids. A fluid flow sensor (114) senses fluid flow. A set point is established based upon predetermined temperature and pressure conditions at which the fluid will be utilized in the process. A valve drive (124) operates a fluid flow valve (126) to the resulting fluid flow rate, this being based upon the sensed flow rate and the set point. A control unit (122) controls the valve drive. The control unit accesses a calibration data set to determine the amount of fluid to be delivered by the fluid flow valve based upon the sensed flow rate and the set point. This calibration data set is created for the controller over its operational range using a calibration fluid having similar thermodynamic transport properties to a process fluid. The instrument is calibrated using the calibration fluid and the data set is produced by converting the calibration data using process fluid data stored in a data base (200). Accessing the data set stored in the instrument together with routing signals over a communication network (300) permits the instrument to precisely control process fluids without having to introduce external correction factors or other adjustments to the process.

39 Claims, 7 Drawing Sheets

THERMAL MASS FLOWMETER AND MASS FLOW CONTROLLER, FLOWMETERING SYSTEM AND METHOD

CROSS REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates to mass rate of measurement fluid flowmeters and flow controllers, and more particularly, to an analog or digital flowmeter employed in manufacturing processes such as the manufacture of semiconductor chips in which highly toxic and highly reactive fluids are used, and because of which, such flowmeters are not calibrated using the fluid they will be controlling during a process.

In the manufacture of semiconductors, integrated circuit (IC) chips and the like, it is necessary to use a variety of fluids (gases) which are highly toxic and/or reactive. A reactive fluid is a gas which is corrosive, flammable, or pyrophoric, among other things. Proper control of these fluids, for example, dichlorosilane ($SiH_2Cl_2$), is therefore mandatory. The same is true in other manufacturing processes as well; although these will not be discussed. Process control in the critical process steps where these fluids are used is accomplished by monitoring the mass flow rate of the gas and controlling appropriate valving to adjust the flow to a desired rate for the process condition. Measuring mass flow rates is old in the art. Essentially it is done using either an analog measuring system, or a digital based system. Regardless of which technique is used, there has been, and until now, continues to be, substantial control problems which must be overcome in order to maintain a process capable of producing quality chips.

There are a number of problems which currently effect flowmeter calibration and performance. While these are discussed in more detail below, these problems are:

a) calibrating a flowmeter using an inert gas produces inaccuracies;
  b) calibrating the flowmeter with a gas that is dangerous for one of a variety of reasons and which can potentially damage the instrument, if the instrument is exposed to air or moisture at any time subsequent to calibration and before installation; and,
  c) calibrating the instrument with a gas (freon, for example) that is environmentally unsound and which also cause one or both of the other two problems noted above.

Because of thermal transport properties in gases such as those used in semiconductor manufacture, for example, the accuracy of current mass flow controllers (whether analog or digital) cannot be guaranteed to a level desirable both by the instrument maker and the end user. Ideally, flow controllers would be tested with the actual gases they control in a process so as to properly calibrate their performance for actual use. However, process capable calibration data generally currently does not exist because the toxic and corrosive nature of certain of these gases require special facilities be used to obtain the necessary information. To perform an instrument calibration in a facility which may be suitable for use with a toxic or reactive fluid is currently very expensive. This is particularly so where a controller may be used with one of many such gases and the controller must be calibrated for use with each. Contracting out instrument calibration available facility is also expensive. It is not unusual for a calibration to cost well over a thousand dollars per instrument. This procedure is simply not cost efficient. Rather, current practice is to calibrate the instrument with an inert gas such as nitrogen ($N_2$) rather than any of the gases with which the controller will be used. The output of the instrument is then scaled using a conversion factor to estimate the performance of the instrument with the process gas. Or, the instrument can be calibrated using a "surrogate" gas. A surrogate gas is one which has specific heat properties which are substantially close to a process gas with which the controller is used. Using a surrogate gas reduces the magnitude of the conversion factor required to adapt the instrument's performance to the process gas.

Another problem involved with instrument calibration does not involve either the gases with which the controller will be used or the calibration facilities. Rather it involves certain calibration fluids currently used and the residual effects such gases may have on the instrument. For example, if a calibration is performed with a gas such as chlorine, unless subsequent purging of the instrument effectively removes all traces of the gas, future exposure of the instrument to moisture, as when the instrument is exposed to air, will result in hydrochloric acid (HCl) being formed. Damage to the instrument caused by the acid will ruin the instrument, requiring a costly replacement.

Yet another problem is simply that some gases are expensive to use and calibrating a flowmeter with such gases is cost prohibitive.

The result of all of this is that process engineers responsible for controlling a manufacturing process and for using mass flow controllers, have devised various techniques to insure the accuracy of the instruments they employ. Each mass flow controller is delivered to its end user with a complete set of calibration data, this data being based upon the inert gas with which the calibration was performed. This data is expressed, for example, as a curve of flow versus set point, and the curve covers the entire operating range of the instrument. The process engineer, using his knowledge of the process and the behavior of the gas used in the process, is able to adapt the calibration curve for the inert gas to the actual process gas using his prior experience. He may employ a "black book" or the like containing conversion factors he will use to interpret instrument readings for the process gas and meter fluid flow accordingly. This "tweaking" however, comes at a price. Certain processes, such as the manufacture of semiconductor devices, require very precise process controls. If inaccuracies in instrumentation occur, useless product results. It will be understood, for example, that a conversion factor typically is accurate only at a single point, and the further readings are away from that point, the greater the divergence from a "true" value and the converted reading. Trial and error experimentation to determine what the adjustment factors for a particular instrument should be can cause delays and also result in lost production, increased down times, increased product costs, etc. Alleviation of problems concerning instrument calibration can have an immediate beneficial impact on many industries.

Another area of concern is the error that arises because of the communications involved in signal handling and processing. All controllers, whether analog or digital controllers, use analog signals at one point or another throughout the processing and control functions performed by a controller. A control system may include a central control computer which commands analog input/output (I/0) cards of a process controller. The I/0 card converts digital signals from the computer to analog set point signals, and analog flow information signals to digital signals supplied to the computer. The system includes the following sources of potential signal error: wire and connector losses, noise pick-up, and analog-to-digital and digital-to-analog conversion errors. Use of completely digital communications between a central computer and mass flow controllers will eliminate various system errors.

BRIEF SUMMARY OF THE INVENTION

Among the several objects of the present invention may be noted the provision of improved flowmeters and mass flow controllers having significantly greater accuracy than either existing digital or analog flowmeters and mass flow controllers. The improvement in digital mass flow controller accuracy, for example, is partially the result of improved signal processing techniques, and partially a result of improved digital communications within the controller. Further, flowmeters and flow controllers can now be individually customized for the process gases with which they are used.

An important object of the present invention is the improvement in measurement accuracy which results from the flowmeter's or flow controller's calibration for a customer's process gas or gases. The calibration process now eliminates the need for "tweaking" by the user's technical personnel and the "cut and try" techniques previously used by such personnel to accommodate a calibrated flowmeter or flow controller to the particular process. The attendant costs and wastes arising from these techniques are now also eliminated, and process development time is shortened since these steps need no longer be performed.

Another important object of the invention is the capability of the improved flowmeter or flow controller to be used in a variety of processes in which highly toxic, highly corrosive, or expensive gases, or some combination thereof are normally used. Even though flowmeter or flow controller calibration is performed on "safe" gases, the calibration is now such that the thermodynamic transport properties of such gases are taken into account as part of the calibration process.

A further object of the invention is the provision of an improved flowmeter or flow controller in which either is independently calibrated for a number of gases with which they are used and the calibration information for each gas is stored within the instrument and is readily accessible by a user. The personnel using the controller now no longer need to maintain separate "little black books" containing relevant information necessary to adjust the instrument's operation, depending upon the gas currently being used in a process.

An additional object of the invention is the creation and usage of a database which contains information relating performance of a flowmeter or flow controller with a gas used in a process as well as that of the instrument with a calibration gas or gases. The database enables the instrument to be readily used with process gases over the entire operating range of the instrument; that is, the instrument is readily used with any of the number of gases for which the instrument is calibrated, and for the entire range of flow rates of these gases in a particular process.

A further object of the invention is to provide a flowmeter or mass flow controller having the capability to remotely zero the flow sensor used with the instrument. Other instrument capabilities include a digitally adjustable setpoint and ramprate, and temperature monitoring for indicating the temperature outside the instrument's flow rate sensor. Also, direct indications can be provided of a sensor's raw output signals and a valve drive signal from the instrument so clogging or restriction of the sensor can be detected. Where a number of instruments are used in a process, the instruments can be interconnected so, for example, their setpoints can be simultaneously adjusted.

It is also a provision of the improved processor of the flowmeter or flow controller to have sufficient data storage capability so all relevant information relating to a calibration is stored in the instrument and is readily accessible by the user. This enables a relationship between data collected for a process gas and representative instrument calibration curves using a calibration gas ($N_2$ for example) to be derived. From their relationship a calibration curve for the process gas can be determined and stored in the instrument, or in an external database accessible by the instrument so this process gas calibration curve can be used during the process.

A further object of the invention is to provide an instrument having stored data sets for various system operating pressures. The controller of the instrument is responsive to a pressure sensor reading or pressure input information from a process control to interpolate between data sets where the sensed pressure is intermediate the pressure values for which the data sets were produced.

Yet another object of the invention is the establishment of a system of fluid flowmeters or flow controllers each of which independently functions within some part of a manufacturing process. The system includes a communications network by which each flowmeter or flow controller can separately, quickly access a database containing relevant information for use by the instrument. This enables each instrument to have the information readily available by which the instrument can readily and precisely monitor and/or control the fluid flow portion of the process with which it is associated.

Finally, it is a particular object of the invention to provide a flowmeter and mass flow controller which can be calibrated quickly, efficiently, and at a reasonable cost, yet provide the necessary precision required when used in a manufacturing process. Further, it is also an object to reduce the complexity of the monitoring and control system in which the instrument is used. This is achieved by an improved communications system that minimizes wiring. In so doing, the overall reliability of the monitoring and control system is significantly enhanced, resulting in substantial savings in process costs for the manufacture of semiconductor devices, for example.

In accordance with the invention, generally stated, a flowmeter or mass flow controller is used in a manufacturing process such as for the manufacture of semiconductor chips. The flowmeter or mass flow controller meters, or meters and controls the flow of one of a variety of fluids used in the process, and a number of meters and/or controllers may be used with the same or different fluids. The process fluid is used in the process under a variety of temperature and pressure conditions. And, the fluids may be toxic, corrosive, or otherwise reactive. The mass flow meter comprises a fluid flow sensor for sensing fluid flow through a passage by which the fluid is directed to a portion of the process where it is used. The flow meter provides an output signal to the user that accurately represents the flow passing through the instrument at a given time. To do this, the instrument includes a processor which accesses stored calibration information derived for one or more process fluids the mass flowmeter measures and covers the operating range of the instrument. The signal from the flow sensor is processed by the instrument's processor using the calibration curve, temperature and pressure information to give an accurate indication of the flow rate.

The mass flow controller comprises the same sensing and signal processing elements as the mass flowmeter with the addition of a valve drive that operates a fluid flow valve to control the mass flow rate of fluid into the process and a control unit. A set point is established by an external input supplied by the user to establish a desired flow rate for a process fluid. The control unit of the instrument operates the valve drive. To do this, the control unit includes a processor which accesses stored calibration information derived for one or more process fluids the mass flow controller controls and which covers the operating range of the instrument. From this calibration curve, the fluid flow rate for the process fluid to be delivered by the valve is determined. The calibration information stored in the instrument is derived from calibration data for a calibration fluid which is not the process fluid whose flow is now being controlled, but which has similar thermodynamic transport properties. The calibration information is stored in a data base and the instrument's calibration is established for a particular process fluid by adapting the instrument's calibration curve for a calibration gas at certain set point conditions over the operating range of the instrument using the process fluid data stored in the data base. As a consequence, even though the instrument is calibrated with an inert gas, for example, the instrument can now accurately meter mass flow of a process fluid it is monitoring without external involvement. This, even though the process fluid is a toxic, reactive fluid. A system of process control employing multiple mass flowmeters and/or mass flow controllers in which set point information is supplied to each instrument, and a method of calibrating a flowmeter or mass flow controller with an inert fluid and adapting the resulting calibration curve so the instrument can be used for toxic, reactive process fluids are also disclosed. Other objects and features will be in part apparent and in part pointed out hereinafter.

BRIEF DESCRIPTION OF THE SEVERAL VIEWS OF THE DRAWINGS

In the drawings.

Corresponding reference characters indicate corresponding parts throughout the drawings.

DETAILED DESCRIPTION OF THE INVENTION

Figure 1:
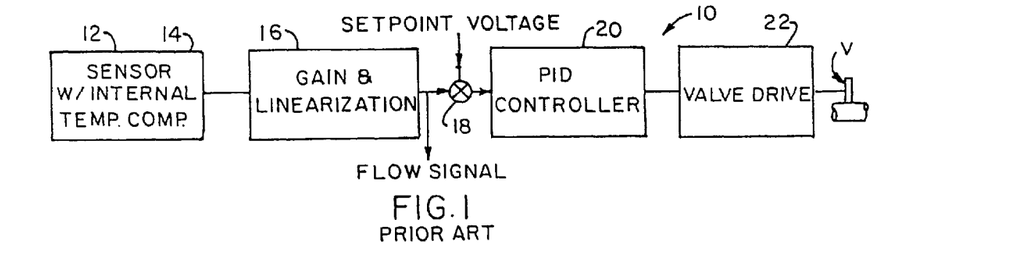
FIG. 1 is a block diagram representation of a prior art analog device for use in mass flow control.

Referring to the drawings, FIG. 1 represents a prior art analog mass flow controller (MFC) 10. In an analog MFC, the functional components of the controller are implemented using resistors, potentiometers, capacitors, amplifiers, etc. In this device, a flow rate sensor 12 is a thermal sensor which, as is well-known in the art, converts the flow rate of a gas into an electrical voltage signal. In a flow controller manufactured by the assignee of the present application, the amplitude of this signal is a function of the thermal gradient (temperature difference) between an upstream and downstream monitoring location, and hence measured flow rate. A thermistor 14 is connected in series with windings (not shown) of the sensor to provide compensation for shifts in the sensor calibration resulting from temperature effects on a measurement. Use of the thermistor typically provides a linear or first order compensation. The full scale output voltage of sensor 12 is on the order of 50 mVDC.

The sensor output is provided to a gain and linearization module 16 in which the analog output signal from the sensor is amplified, linearized, and then supplied to a junction point 18. Module 16 employs feedback to produce a linear output to the summing point and controller, filtering to eliminate noise effects on the output signal, and adjustable components (potentiometers) for controller calibration. The output signal from module 16 is, for example, variable from 0–5 VDC, and a setpoint input to the controller also varies between 0–5 VDC. These signals are summed at junction point 18 and their difference is provided to a controller 20 which uses the difference value to determine the position of a fluid flow control valve V. The valve position is controlled by a valve drive 22 to which outputs from controller module 20 are provided. The controller module takes into account factors such as the established operating setpoint, and overshoot, undershoot, and steady-state operating conditions to determine the valve V position.

Figure 2:
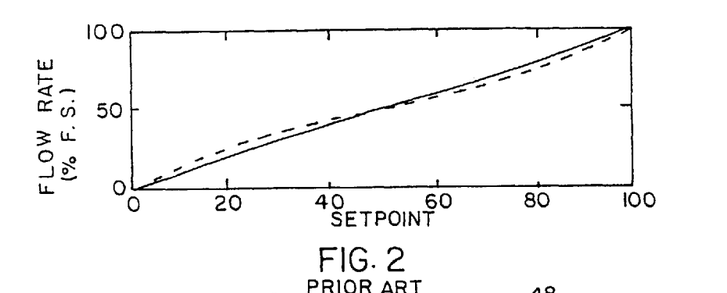
FIG. 2 represents a characteristic flow curve for the analog mass flow controller.

Calibration of analog device 10 is performed by determining and adjusting the flow of a calibration fluid at three points within the metering range of the instrument. These points reflect 0%, 50%, and 100% of the instrument's scale range. Based upon the instrument's performance, the potentiometers within module 16 are adjusted so the resulting calibration curve is essentially as represented by the dashed line in FIG. 2. That is, they are adjusted to control the instrument's zero, span, and linearity. As can be seen in the Figure, the ideal curve is a straight line (the solid line) extending between the 0,0 and 100,100 co-ordinates on the curve. However, the calibration curve may have a positive or negative offset at the respective ends of the curve; i.e., at the higher and lower flow rates. It will be understood that the dashed line representation in the Figure is exaggerated for purposes of understanding the performance capabilities of the instrument. The actual worst case error of a calibrated instrument is on the order of ±1% full scale.

Figure 3:
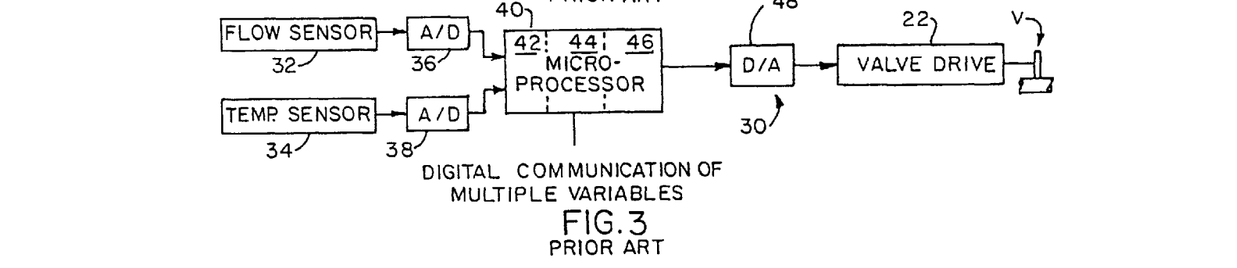
FIG. 3 is a block diagram representation of a prior art digital device for use in mass flow control.

Referring to FIG. 3, a prior art digital mass rate flow controller 30 includes a flow sensor 32 and a temperature sensor 34. Here, an analog output signal from each sensor is separately provided to an analog-to-digital converter (ADC) 36, 38 respectively. ADC 36 is, for example, a twenty-four bit converter, as is ADC 38. The digital output from each converter is applied as a separate mathematical input to a microprocessor 40. Microprocessor 40 incorporates three elements. First is a microcontroller 42, second is a 64K by 8 erasable programmable read-only-memory or EPROM 44, and third is a 4K by 8 EEPROM 46. Operating software for running controller 30 is stored in EPROM 44, and product information and calibration tables are stored in EEPROM 46. The software implemented in the microprocessor performs the linearization and filtering functions performed in module 16 of the analog controller 10, as well as the controller 20 functions of the analog instrument. In addition, the microprocessor has enhanced performance capabilities in these areas as well as the capability to provide performance outputs to the user on a timely basis.

The control output from the microprocessor is a digital signal supplied to a digital-to-analog converter (DAC) 48 which produces an analog signal for valve drive 22 to open and close valve V.

For purposes of this application, it will be understood that the distinction between an analog and a digital flowmeter is that in an analog unit, the basic signal conditioning and control functions are performed using an operational amplifier (op-amp). In a digital unit, a microprocessor performs these functions. It will further be understood that in a flowmetering system, a digital flowmeter, for example, may be used with an analog communications system. Other variations are also possible depending upon the user's system in which a flowmeter or flow controller is installed.

Figure 4:
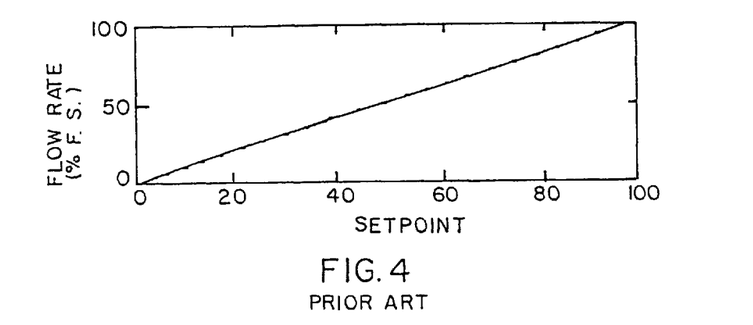
FIG. 4 represents a characteristic flow curve for the digital mass flow controller.

Calibration of a digital flow controller differs significantly from the calibration of an analog flow controller. Now using variable digital values, a full scale flow rate having an accuracy on the order of ±2% is produced. Next, the flow controller is operated at a number of different set points (ten, for example) over the operating range of the instrument. Performance data is accumulated for each set point. An equation is now generated using the resulting text data. The equation represents the calibration curve for the instrument over the entire operating range of the instrument. Using the equation, a table of calibration points (twenty-five, for example) is created and stored in memory 46 of the controller. A plot of the flow rate vs. set point curve is illustrated in FIG. 4. The values displayed on the curve of FIG. 4 are corrected using temperature information from sensor 34. The combination of the information from the curve, and the temperature correction, result in a worst case flow rate error on the order of ±0.2% full scale. Memory 46 of controller 30 is capable of storing multiple calibration curves so the controller can be separately calibrated for multiple gases and multiple flow rates.

As previously mentioned, it has heretofore been impractical to always calibrate a controller with the process gas with which the controller is used. Rather, an inert calibration gas, or a surrogate gas having similar fluid thermodynamic properties to the process gas have been used for calibration. The subsequent user of the controller then applies a conversion factor between measured flow rate data, and the calibration curve data, to generate a desired flow rate value for a particular set point. This conversion factor is based upon the relative thermodynamic properties of the calibration fluid and a process fluid with which the controller is used. As noted, users of the flow controller have separately determined a conversion factor for use with a particular process fluid under given set point conditions. This leads to process inefficiencies, as well as errors in performance.

Figure 5:
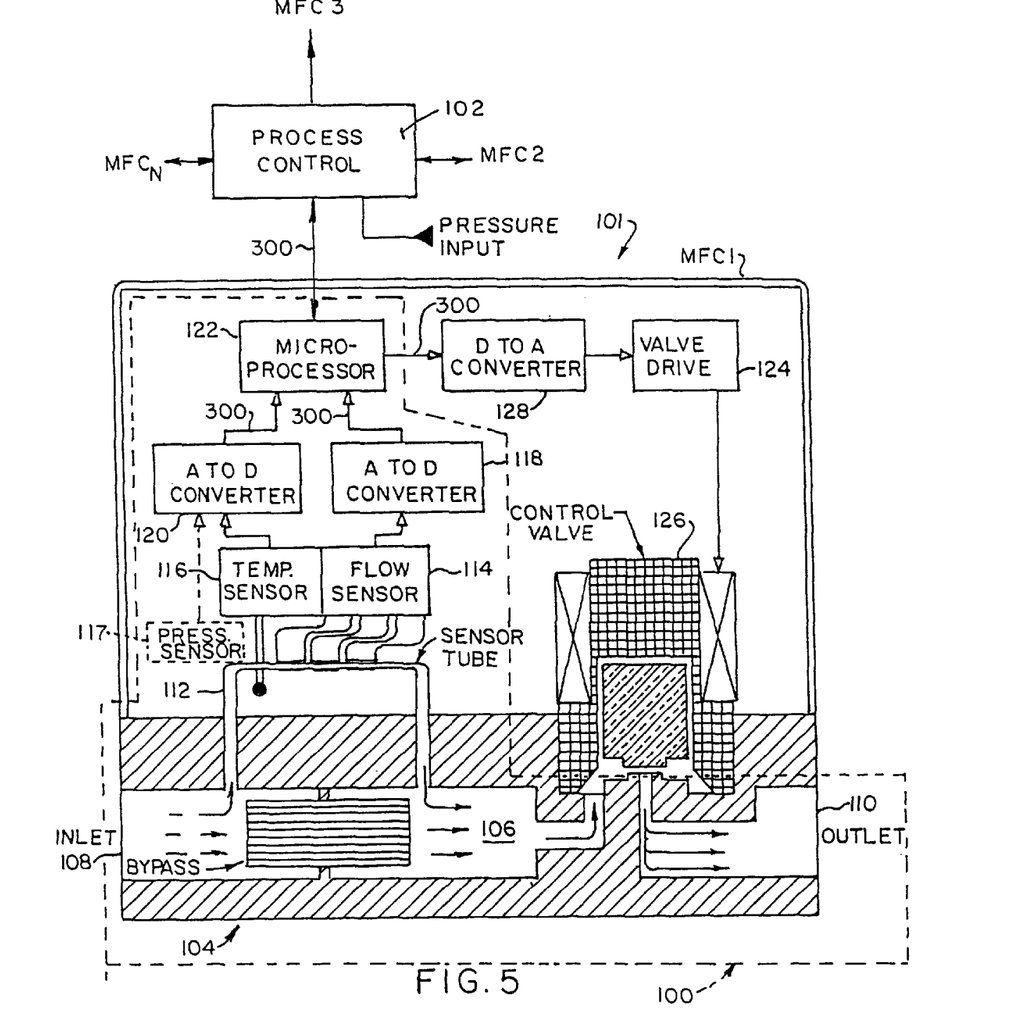
FIG. 5 is a block diagram representation of a digital mass flow controller of the present invention used in a system of mass flow controllers for controlling process fluids at different locations in a manufacturing process.

Referring now to FIG. 5, a flowmeter of the present invention is indicated generally 100 and a flow controller 101. The flowmeter or flow controller can be used individually; or, as shown in FIG. 5, in a system having a plurality of other flowmeters and flow controllers indicated MFC2... . MFCn. When used in a system, respective flowrneters and flow controllers are in communication with a process control 102 is used to monitor the process and to establish set point conditions for each instrument. In FIG. 5, flowmeter 100, which is shown to be a digital flowmeter, is connected to a fluid flow control portion of a process 104. The portion of the process with which flowmeter 100 is associated includes a fluid flow passage 106, an inlet 108 to the passage, an outlet 110 from the passage, and a bypass 112 through which a portion of the process fluid flows. In common parlance, bypass 112 is also referred to as a restrictor, flow shunt, or flow splitter. Fluid flow through bypass 112 is monitored by a flow sensor 114 of the flowmeter, and by a temperature sensor 116. A pressure sensor 117 may also be used by the instrument. The fluid flow information gathered by sensor 114 is an analog signal output to an A/D converter 118. Similarly, the output of temperature sensor 116 (or pressure sensor 117) is an analog output which is provided as an input to an A/D converter 120. The digital signal outputs of the A/D converters are supplied to a microprocessor 122 of the flowmeter. Stored within a memory portion of the microprocessor are a series of data sets representing calibration curves developed for the instrument using data developed specifically for the process fluids with which the flowmeter or flow controller is used and for specific fluid pressure and fluid flow conditions. The microprocessor, utilizing the data set or fluid calibration curve for established set point conditions for the process, and the process fluid flow data, is now able to generate a fluid flow signal by which accurate flow rates are achieved. The result is the production of a control signal for a valve drive 124 by which the valve drive can open or close a flow control valve 126 and precisely control process fluid flow through the passage. The control signal from microprocessor 122 is a digital signal supplied to a D/A converter 128 to produce an analog signal used by valve drive 124.

Figure 6:
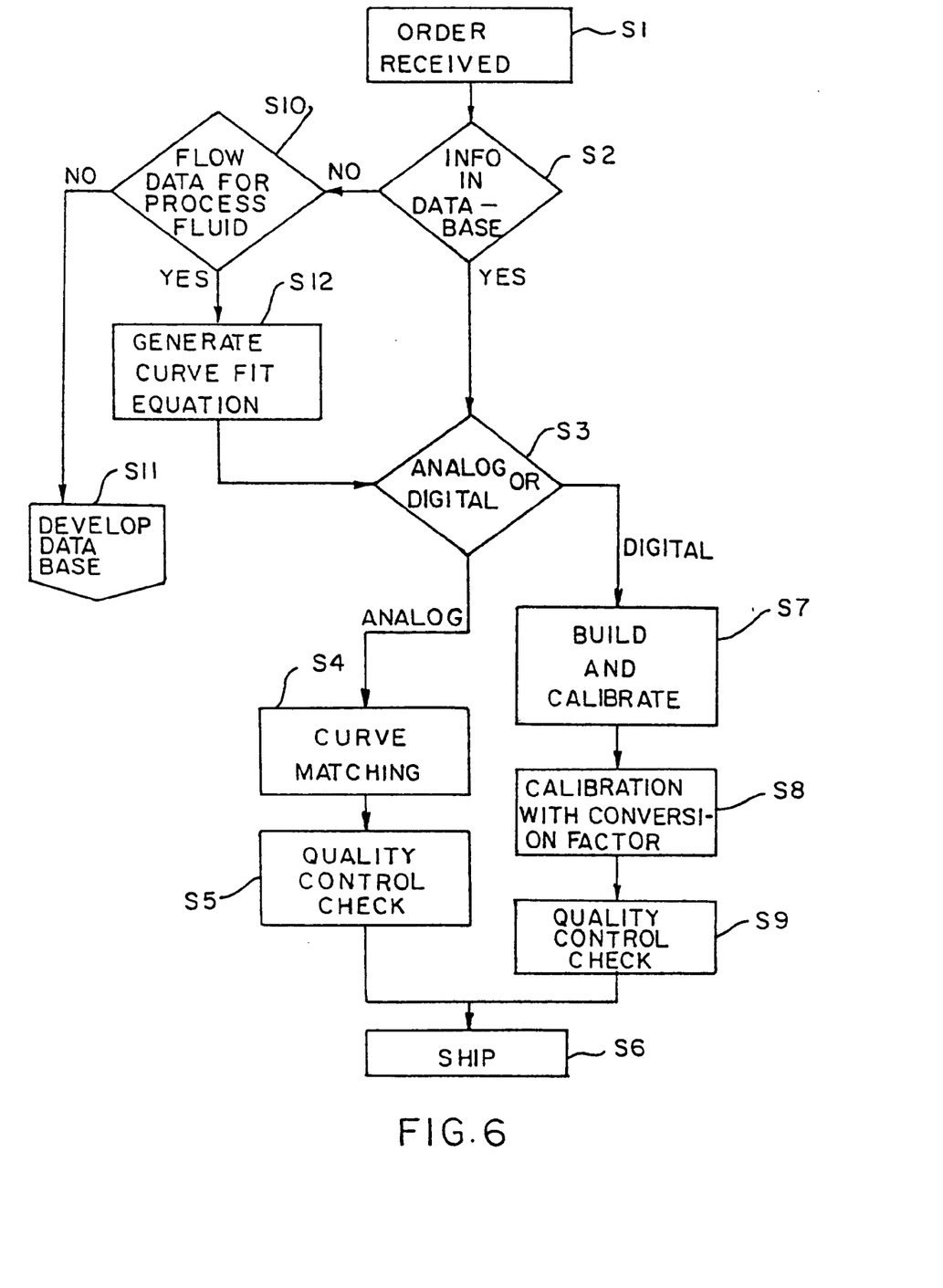
FIG. 6 is a flow chart illustrating the creation and use of a process fluid data base for calibration of mass flow controllers.
Figure 7:
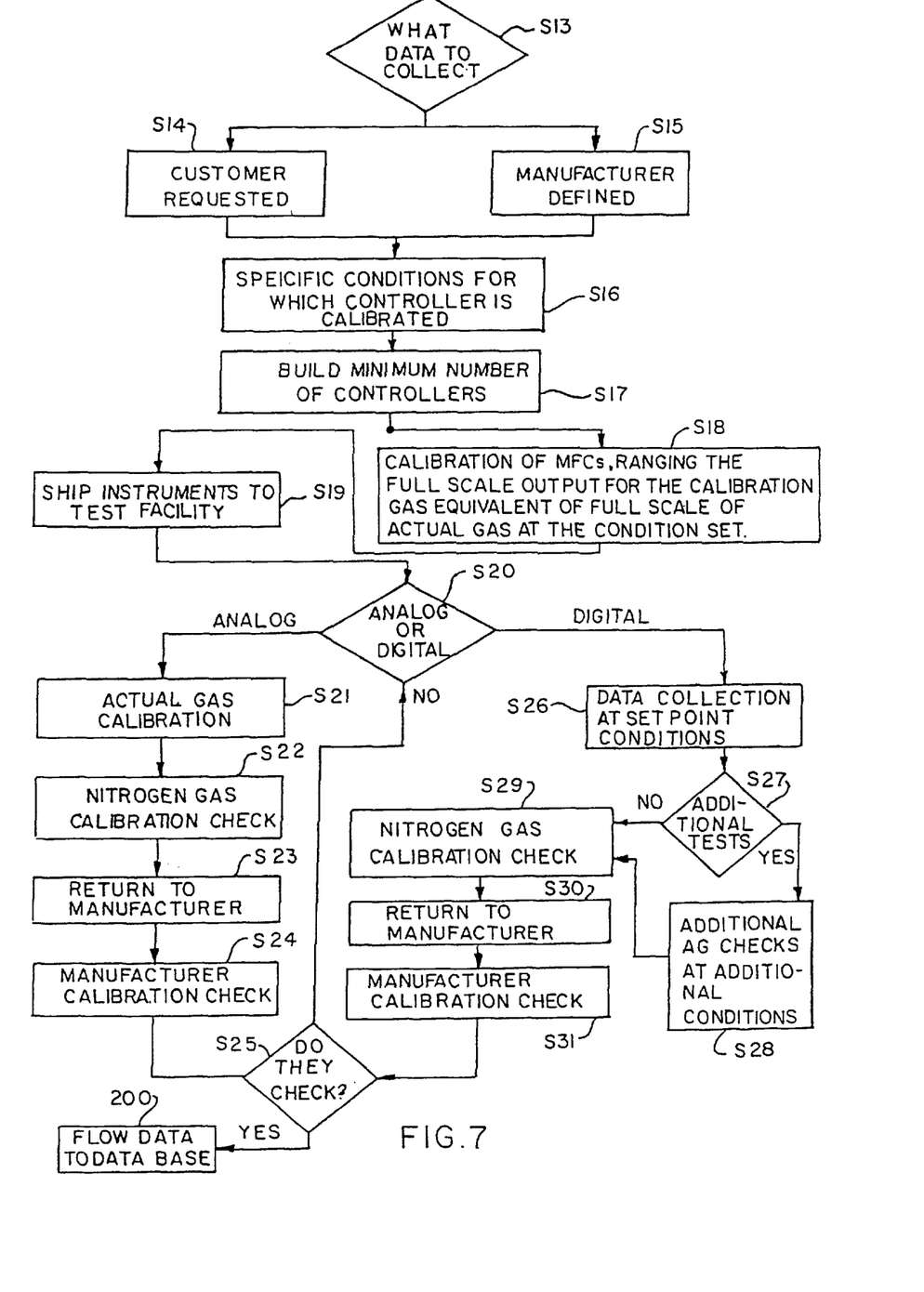
FIG. 7 is a flow chart illustrating how a data base for a particular process fluid is created.

Referring to FIGS. 6 and 7, the flow charts of the Figures. set forth how a determination is made as whether or not a flowmeter 100 or mass flow controller 101 is to be used with a process fluid for which flow control data exists, whether or not flow data for a particular process fluid is already stored in a data base; and, if not, how flow control data for the process fluid is developed, stored in the data base, and used to create a data set stored in a memory portion of microprocessor 122 of the instrument. When an order for a flow controller is received as indicated at step S1, the order typically includes a set of operating criteria in which the instrument will be used to control flow rate of a process fluid. This criteria includes the process fluids with which the controller will be used, as well as the flow range, and temperature and pressure conditions. A determination is therefore first made as to whether flow control information for the fluid or fluids and the range of operating conditions are currently in the data base. This is step S2 in FIG. 6. If so, the next determination is whether the flowmeter or mass flow controller will be an analog or digital instrument. This occurs at step S3.

If the instrument is an analog instrument, then the instrument is constructed and a calibration is performed on the instrument using nitrogen gas, for example. This calibration is then matched to a companion curve generated from the stored flow data for the process fluid. This is step S4. At step S5, a quality control check is performed to verify that the companion curve does match. If there is verification, then the instrument is shipped as indicated at step S6.

If the instrument is to be a digital flowmeter or mass flow controller, then at step S7, the instrument is constructed and calibrated. Again, nitrogen gas is the calibration fluid. Now, a scaling or conversion factor is used to determine full scale flow of nitrogen and a conversion factor equation is developed based on the calibration results. Generation of the scaling factor is discussed hereafter. The conversion factor equation is stored in the microprocessor memory of the instrument. At step S8, the equation is used to produce a calibration for the instrument for the process gas with which the controller is used, and the given set of operating conditions. Next a quality control check is made of the instrument. This is step S9. If successful, the digital mass flow controller is shipped.

Returning to step S2, if there is currently no information in the data base for a particular process fluid or set of operating conditions for a process fluid, then we proceed to step S10. At step S10, it is determined if there is any flow data for a particular process fluid; and if so, what are the "bounding" conditions for the data. That is, what are the temperature and pressure conditions for which flow data was obtained, and how closely do these bounding conditions approximate those under for which the instrument will be used with the fluid. If there is no relevant information, then data base information will be developed at step S11 and as discussed with reference to FIG. 7. If there is bounding information for the process gas as indicated at step S12, a conversion factor is developed by which a companion curve can be generated for use in the instrument's calibration. This is the conversion factor used at step S8 in the calibration of a digital mass flow controller.

Referring to FIG. 7, step S11 involves generation of process fluid information for inclusion in a data base. The data is accumulated for a variety of process fluids for a range of operating conditions. At step S13, the threshold question to be asked is what data to collect. There are two sets of such data as indicated by steps S14 and S15. Step S14 is the information requested by the customer for the process gases and sets of conditions under which the gas will be used. Step S14 includes the calibration information normally generated by the instrument manufacturer. That is, the manufacturer will have a standard calibration procedure (or procedures) which is normally performed on each instrument. From the information gathered at steps S14 and S15, an overall calibration plan for the instrument is defined at step S16. This information now includes all of the process fluids with which the instrument will possibly be used, full scale flow values, and the range of temperature and pressure conditions for the various process fluids.

Next, the manufacturer builds a number of instruments as indicated at step S17. By building a minimum number of instruments, statistical validity of the instruments' calibration can be determined. As indicated at step S18, the instruments are then calibrated. Part of this procedure includes ranging the full scale output for a calibration gas equivalent of the actual (process) gas for given sets of conditions. That is, obtaining data for the defined range of conditions using a gas having thermodynamic transport properties which closely match those of the process fluid. After testing is complete, the instruments are transported (step S19) to a calibration installation which has facilities to develop the flow data for the process fluids with which the instruments are used.

At the test facility, and as indicated at step S20, the instruments are separated into analog and digital groupings.

For an analog instrument, an actual gas calibration is performed using a process fluid at each of a set of pressure and temperature conditions (i.e., P1-T1, P2-T2, . . . Pn-Tn). This is step S21. At step S22, a calibration check procedure is performed using a calibration gas at the same pressure conditions as the process gas and the calibration gas calibration data is compared against that obtained for the process fluids. The instruments are then returned to the manufacturer (step S23) where calibration tests are made at the various pressure conditions using the calibration gas (step S24). The resulting calibration data is now checked (step S25) and if the results correlate with those from the testing facility, the flow data for the process fluid for the given sets of conditions are entered into a data base 200 established for this purpose. If the results do not correlate, then the process set out in steps S20–S24 is repeated.

For a digital flowmeter, as indicated at step S26, data for the actual gas is collected at specific set point (temperature and pressure) conditions. If additional testing is desired, in order to obtain bounding conditions for performance predictions, then further actual gas testing is performed for additional conditions (step S27). If no additional testing is done, then a calibration check (similar to that performed at step S22 for analog controllers) is performed (step S29). Thereafter, the instruments are returned to the manufacturer (step S30) for the manufacturer to perform a calibration check at his facility (step S31). Again, if the calibrations check out, the data is incorporated in data base 200. If not, steps S25–S31 are repeated.

It will be understood that now, unlike with previous instruments and calibration systems, one or more data sets can be created for each flowmeter or mass flow controller, not only for each process fluid with which the instrument is used, but for the range of flow conditions which will be experienced in carrying out the process with which the fluid is used. These data sets are represented by stored calibration curves. Now, when a set point is established, the control means of the instrument can access the appropriate data set to provide the appropriate flow control signal to the valve means for sensed temperature and/or pressure conditions. This capability eliminates the need for external manipulation of process temperature and pressure data, to provide flow control inputs into the process. Further, once the data base 200 is established, it can be updated, amended, etc. as additional process fluid information is collected. This not only improves the quality of instrument calibration, but reduces the time and cost involved in performing a calibration.

Figure 8A:
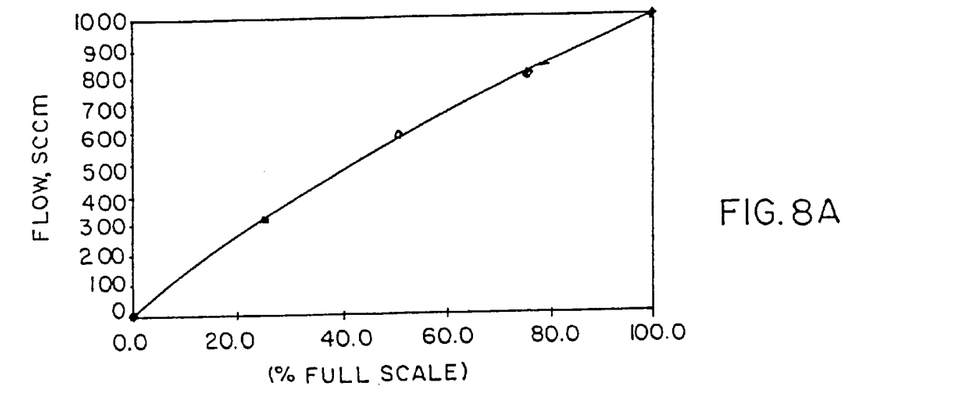
FIGS. 8A and 8B are calibration curves illustrating a linearization method for calibrating a digital mass flow meter.
Figure 8B:
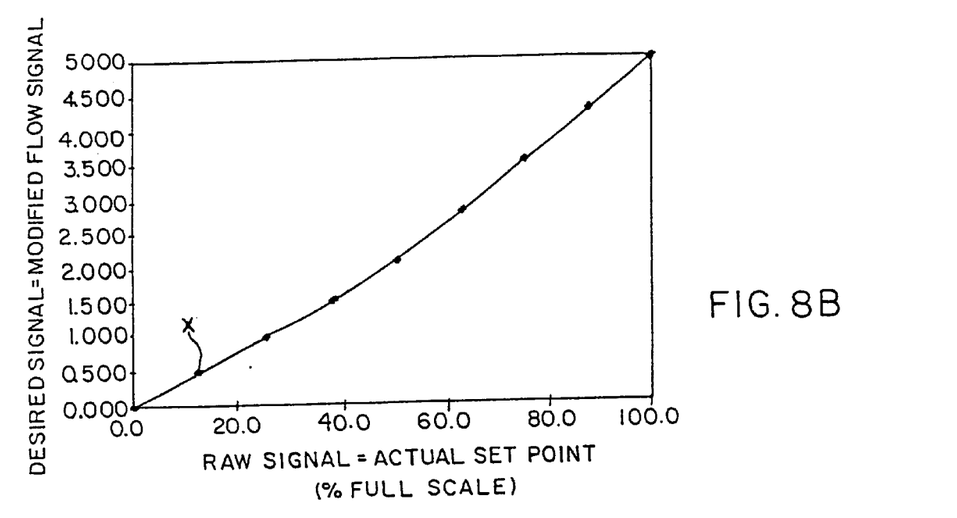

Referring now to FIGS. 8A and 8B, there is presented a simplified calibration/linearization method for a digital flowmeter or mass flow controller.

TABLE 1

| 1<br>Set point and Raw Signal | 2<br>Measured Flow, N2 | 3<br>Curve fit N2 Flow | 4<br>Desired Flow, N2 | 5<br>Desired Signal N2 as gas | 6<br>Signal in Engr. Units, N2 |
|---|---|---|---|---|---|
| 0.000 | 0 | 0 | 0 | 0.000 | 0 |
| 0.625 |  | 160 | 125 | 0.488 | 125 |
| 1.250 | 320 | 320 | 250 | 0.977 | 250 |
| 1.875 |  | 470 | 375 | 1.496 | 375 |
| 2.500 | 600 | 600 | 500 | 2.083 | 500 |

TABLE 1-continued

| 1<br>Set<br>point and<br>Raw<br>Signal | 2<br>Measured<br>Flow,<br>N2 | 3<br>Curve<br>fit N2<br>Flow | 4<br>Desired<br>Flow,<br>N2 | 5<br>Desired Signal<br>N2 as gas | 6<br>Signal in Engr.<br>Units, N2 |
|---|---|---|---|---|---|
| 3.125 |  | 700 | 625 | 2.790 | 625 |
| 3.750 | 800 | 800 | 750 | 3.516 | 750 |
| 4.375 |  | 900 | 875 | 4.253 | 875 |
| 5.000 | 1000 | 1000 | 1000 | 5.000 | 1000 |

Using the data from the above table 1, the curve shown in FIG. 8A is plotted for flow volume in standard cubic centimeters per minute as the abscissa and a set point and raw signal value as the ordinate. The range for the set point is from 0.0 to 5.0, and five points are plotted to generate the curve. The set point values are listed in column 1 of the chart, the five plotted points in column 2. Once the curve has been created, the curve fit flow values listed in column 3 are taken directly from the plot.

FIG. 8B illustrates a calibration curve for a digital flowmeter or flow controller in which the ordinate is the same as in FIG. 8A. Now, the abscissa is for a desired signal and represents a modified set point value. These value are derived from the measured flow data for a set point as follows:

A desired flow is listed in column 4 of the chart. The desired signal representing this flow is equal to the desired flow value of column 4, divided by the curve fit flow value of column 3, and with the result of the division multiplied by the raw signal value of column 1. That is, Desired signal=(desired flow/curve fit flow)*raw signal As an example of how the curve of FIG. 8B is generated, for a raw signal value of 0.625 (point X in FIG. 8B), the desired flow value in column 4 is 125, and the curve fit flow value in column 3 is 160. Using the above equation, the desired signal value is desired signal=(125/160)*0.625=0.488 which is the value entered in column 5. In column 6, the desired signal is expressed in engineering units. The values in this column are arrived at by multiplying the desired signal value in column 5 by a gas scaling factor. The values calculated for columns 5 and 6 now represent stored calibration data.

With respect to the curve shown in FIG. 8B, once all of the desired signal values have been calculated, the calibration is linear fit between adjacent points. The table of data points for this curve are stored in the memory portion of the microprocessor for the instrument. Now, when a set point is established, the desired signal representing measured flow of the process fluid for that set point can be found in a look up table in the memory. Thus, as illustrated in FIG. 8B, for a set point of 4.000, the desired signal can be readily established. Here, it is approximately 3.850.

Figure 9A:
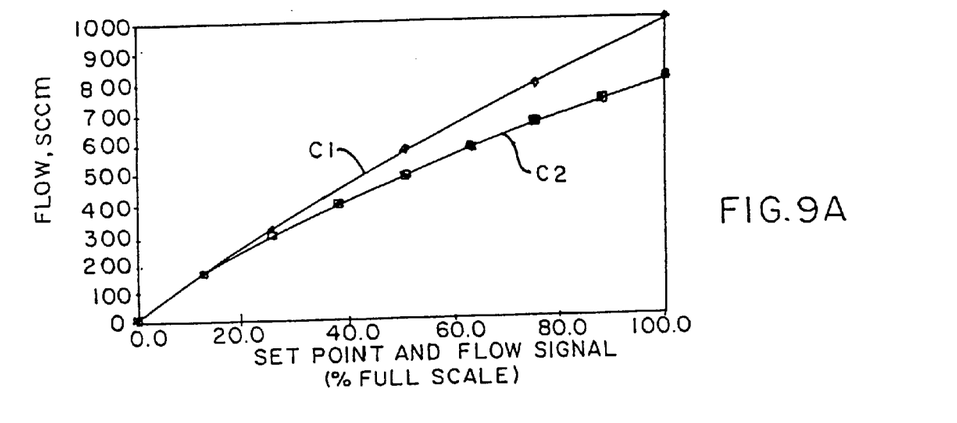
FIGS. 9A and 9B are similar calibration curves to those in FIGS. 8A and 8B but reflect the calibration method of the present invention.
Figure 9B:
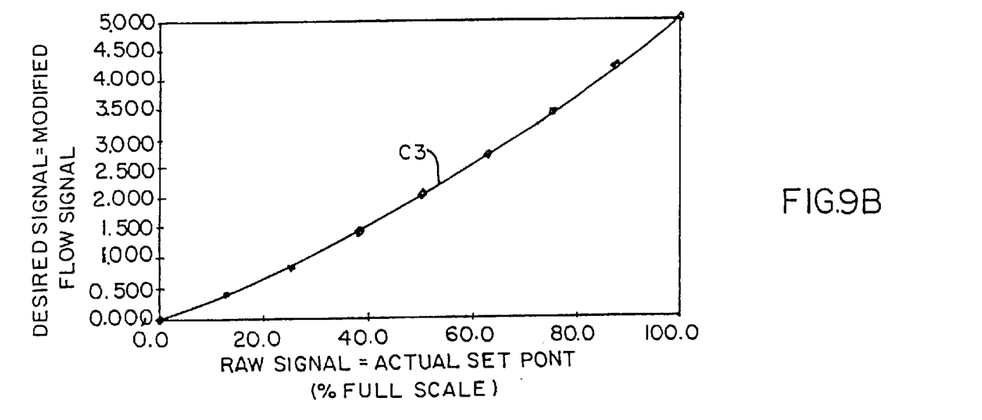

Referring to the table 2 set out below and the FIGS. 9A and 9B, a calibration performed on a digital flowmeter first comprises performing the steps involved in collecting the measured flow data set out in column 2 of the table, using nitrogen gas, for the set point conditions listed in column 1 of the table. As in the previously described calibration, a curve fit is made using the measured flow data. The resulting fitted curve is indicated C1 in FIG. 9A. Next, similar data is gathered for a process gas, the actual gas (AG), with which the digital flow meter would be used, and a calculated AG curve is generated as indicated by curve C2 in FIG. 9A.

TABLE 2

| 1<br>Set point and<br>Raw Signal | 2<br>Measured<br>Flow, N2 | 3<br>Curve fit<br>N2 Flow | 4<br>Data set<br>C.F. eqn | 5<br>Theoretical<br>Actual Flow<br>AG | 6<br>Desired Flow<br>AG | 7<br>Desired Signal<br>AG as gas | 8<br>Signal in Engr.<br>Units, AG |
|---|---|---|---|---|---|---|---|
| 0.000 | 0 | 0 | 1.000 | 0.000 | 0 | 0.000 | 0 |
| 0.625 |  | 160 | 1.000 | 160.000 | 100 | 0.391 | 100 |
| 1.250 | 310 | 310 | 0.938 | 290.625 | 200 | 0.860 | 200 |
| 1.875 |  | 455 | 0.872 | 396.915 | 300 | 1.417 | 300 |
| 2.500 | 575 | 575 | 0.850 | 488.750 | 400 | 2.046 | 400 |
| 3.125 |  | 690 | 0.843 | 581.571 | 500 | 2.687 | 500 |
| 3.750 | 790 | 790 | 0.838 | 661.625 | 600 | 3.401 | 600 |
| 4.375 |  | 895 | 0.822 | 735.889 | 700 | 4.162 | 700 |
| 5.000 | 1000 | 1000 | 0.800 | 800.000 | 800 | 5.000 | 800 |

From these two curves, a ratio of values between the respective data values used in generating the curves can be created. The respective ratios for each set point are tabulated in column 4 above. Using this information, theoretical actual flow values for the actual gas can be calculated using the equation:

theoretical actual flow=curve fit equation value (column 4)*curve fit N2 flow (column 3)

Using this equation, the values listed in column 5 are tabulated.

Referring to table 3, and FIGS. 10A and 10B, the data set equation correction factors tabulated in column 4 of table 2, are arrived at as follows.

TABLE 3

| A<br>Set point and<br>Raw Signal | B<br>Average<br>Measured<br>Flow, AG | C<br>Average<br>Measured<br>Flow, N2 | D<br>Average<br>Curve Fit<br>Ag flow | E<br>Average<br>Curve Fit<br>N2 Flow | F<br>Ratio of<br>Average<br>Curve Fits |
|---|---|---|---|---|---|
| 0.000 | 0 | 0 | 0 | 0 |  |
| 0.625 |  |  | 160 | 160 | 1.000 |
| 1.250 | 300 | 320 | 300 | 320 | 0.938 |
| 1.875 |  |  | 410 | 470 | 0.872 |
| 2.500 | 500 | 600 | 510 | 600 | 0.850 |
| 3.125 |  |  | 590 | 700 | 0.843 |
| 3.750 | 680 | 800 | 670 | 800 | 0.838 |

TABLE 3-continued

| A<br>Set point and<br>Raw Signal | B<br>Average<br>Measured<br>Flow, AG | C<br>Average<br>Measured<br>Flow, N2 | D<br>Average<br>Curve Fit<br>Ag flow | E<br>Average<br>Curve Fit<br>N2 Flow | F<br>Ratio of<br>Average<br>Curve Fits |
|---|---|---|---|---|---|
| 4.375 | | | 740 | 900 | 0.822 |
| 5.000 | 800 | 1000 | 800 | 1000 | 0.800 |

Figure 10A:
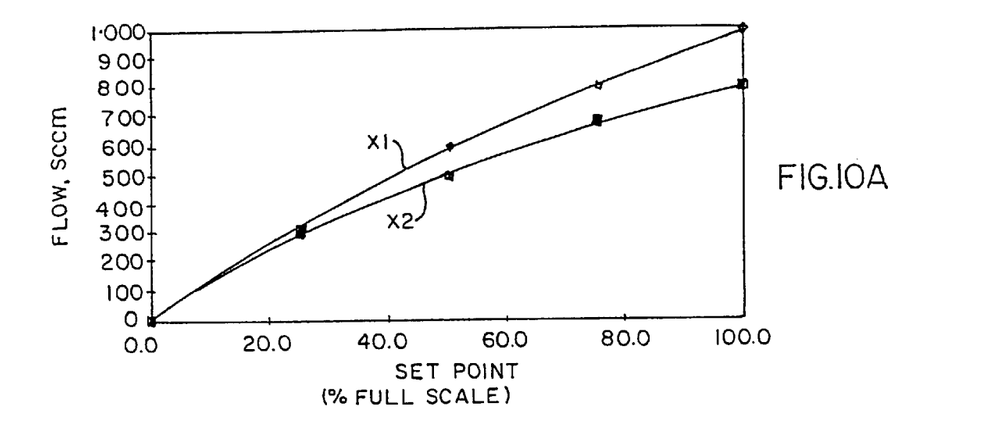
FIGS. 10A and 10B are curves illustrating data set generation for use in calibrating digital flowmeters in accordance with the present invention; and, FIG. 11 is a curve or data set generation for use in calibrating an analog flowmeter.
Figure 10B:
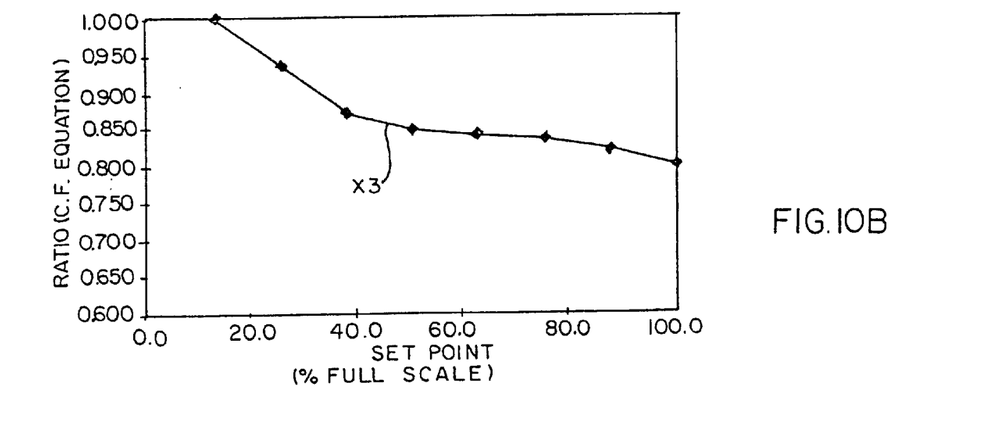

In FIG. 10A, curve X1 is a plot of the measured flow data for the actual gas, and curve X2 the measured flow data for the N2 gas. These plots are measured on the average measured flow values listed in columns B and C of table 3. The values respectively listed in columns D and E are the flow values for the set point values of column A, as taken from curves X1 and X2. The ratio values listed in column F of the table are arrived at by dividing the value for actual gas flow listed in column D by the N2 flow value in column E. Thus for the set point value 0.125, the actual gas flow value 300 divided by the corresponding value 320 for N2 gas yields a ratio of 0.938. A curve X3 shown in FIG. 10B is a plot of the calculated ratios shown in column F. In accordance with the teachings of the invention, the actual gas and nitrogen or calibration gas values listed in table 3, and the calculated ratio values, are stored in the data base now used for mass flow controller calibration.

In column 6 of table 2, desired flow values for the actual gas are listed. For each desired flow level, a corresponding desired signal level can be determined from the equation:

desired signal=(desired flow/curve fit flow)*(raw signal)

Thus for example, for a desired actual gas flow of 100, the desired signal is calculated as desired flow=(100(column 6 value)/160(column 2 value))*0.625(column 1 value)

The resultant value is entered in column 7. After these values are produced, the curve C3 shown in FIG. 9B is generated. Also, and as listed in column 8 of the table, the signal in engineering units for the actual gas can be created by multiplying the desired signal values of column 7 by a gas scaling factor.

For flowmeter 100 or flow controller 101 of FIG. 5, the microprocessor 122 has stored therein data sets of process fluid calibration information which effectively comprises a series of curves C3. These curves are for all the process gases with which the controller is used and allows the instrument to provide accurate flow control for each of the process gases for the entire range of set point conditions with which may be encountered by the instrument as part of the process. Each of the other digital mass flow controllers MFC2–MFCn is similarly calibrated for the process fluids with which they are used. The process control 102 to which each of the mass flow controllers is connected, provides updated set point and other relevant information to each of the units. The process control can poll each separate instrument to obtain status and other pertinent information used to control the process.

An important advantage of such an instrument calibrated in accordance with the method of the invention, is that the flow control curve C3 developed by each controller for each process fluid, eliminates the need for "tweaking", or otherwise having to refine flow process information developed by a flow controller to a fluid flow rate for a process fluid. As previously mentioned, it is not only desirable to calibrate digital flowmeters and mass flow controllers using the method of the invention, but analog instruments as well. Accordingly, table 4 includes calibration gas data and process fluid or actual gas data.

TABLE 4

| 1<br>Set point and<br>Raw Signal | 2<br>Average<br>Measured<br>Flow, AG | 3<br>Average<br>Linearized<br>Flow, AG | 4<br>Average<br>Measured<br>Flow N2 | 5<br>Average<br>Curve Fit<br>N2 Flow |
|---|---|---|---|---|
| 0.000 | 0 | 0 | 0 | 0 |
| 0.625 | | | | 140 |
| 1.250 | 300 | 220 | 270 | 270 |
| 1.875 | | | | 375 |
| 2.500 | 510 | 400 | 480 | 480 |
| 3.125 | | | | 590 |
| 3.750 | 680 | 580 | 720 | 720 |
| 4.375 | | | | 850 |
| 5.000 | 800 | 800 | 1000 | 1000 |

Figure 11:
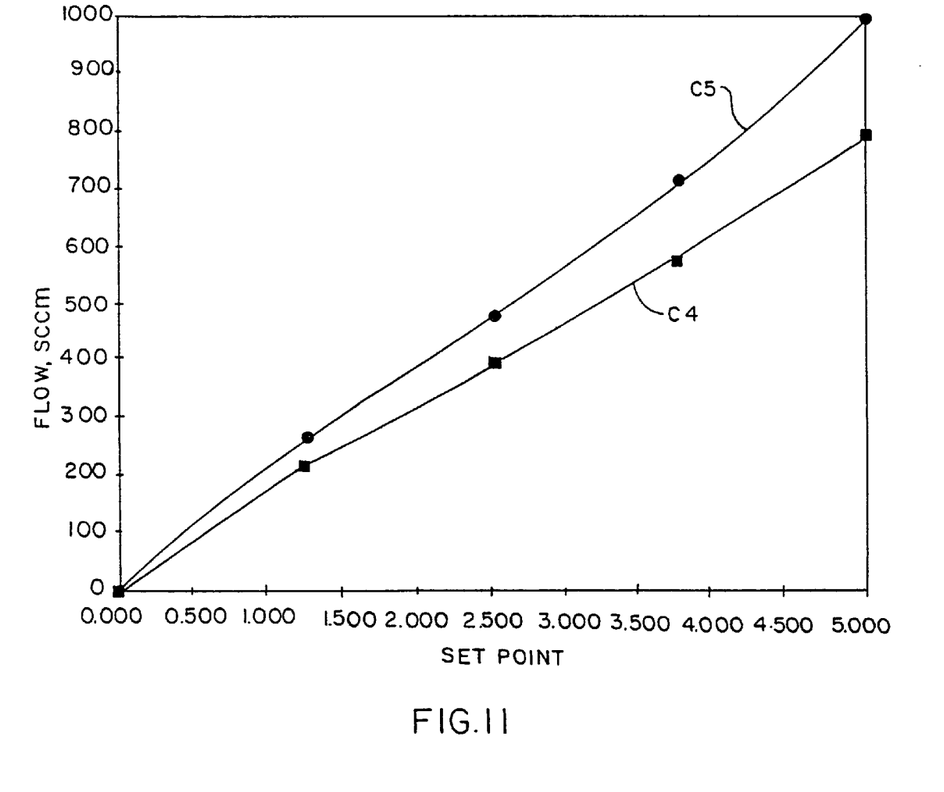

The data in column 2 of table 4 represents average measured flow data for the actual process gas. After linearization, the data is plotted as shown by curve C4 in FIG. 11, and listed in column 3 of the table. After data has been similarly acquired for the calibration gas, the process steps previously described with respect to digital instrument calibrations are performed. The result is the curve C5 in FIG. 11 and the data points listed in column 5 of the table.

The digital flow meters MFC1–MFCn shown in FIG. 5, could be analog flow meters with the same process control capability being realizable. Again, the flow controllers could be connected in a communications system with a process control whereby the process control is able to provide set point and other relevant information to each controller and receive current process fluid flow information in return.

A further advantage of the invention is the establishment of an improved, digital communications system 300 for routing information to and from the process control and individual instruments. This digital system eliminates signal errors resulting from noise and other effects. Elimination of such errors increases the precision with which the process is controlled thereby increasing the quality of the product produced by the process.

What has been described is an improved flowmeter or mass flow controller having significantly greater accuracy than conventional digital or analog units. The instrument has both improved signal processing and digital communications capabilities, and can be specifically calibrated for the manufacturing process in which it will be used. It is a particular advantage of the method of the invention to quickly and efficiently calibrate digital and analog flowmeters and mass flow controllers, and to do so at a reasonable cost while providing a high precision instrument such as is needed in certain manufacturing processes. Additionally, the complexity of signaling and controlling a process is reduced because of the improved system's communications. Overall, monitoring and control capabilities are increased which produces savings in process costs for the manufacture of articles such as semiconductor devices. Calibration is based upon a particular customer's process gas or gases and eliminates the "tweaking" and "cut and try" techniques now used to accommodate an instrument to a particular application. Although calibration is done using "safe" gases, instead of the highly toxic and highly reactive gases with which an instrument is actually used, the thermodynamic transport properties of such gases are readily taken into account during calibration. Representative units are independently calibrated for each of a number of gases with which it is used, with the calibration information of each gas stored within a memory of a flowmeter or flow controller, the instrument having sufficient data storage capability so all relevant instrument and calibration data is stored in the instrument and is readily accessible by the user. To facilitate instrument calibrations, a database is created containing information relating to a unit's operation with a gas as well to that of the calibration gases. The database enables calibration accuracy to be consistent over the unit's entire operating range, regardless of which gas with which the instrument is used, and the entire range of gas flow rates. The improved instrument also has a remote capability, a digitally adjustable setpoint and ramprate, and temperature monitoring for indicating the temperature outside the instrument's flow ate sensor. A direct indication is also provided of the Mw sensor signal and valve drive signal to detect sensor clogging or restriction. Multiple flow controllers can be interconnected into a flowmetering system for facilitating process control wherein each flowmeter is able to access the database to obtain information pertinent to just that flowmeter to enable each flowmeter to separately regulate fluid flow in respective areas of the process.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

Having thus described the invention, what is claimed and desired to be secured by Letters Patent is:

1. A flowmeter for use in a manufacturing process for controlling the flow of one of a variety of fluids used in the process, a process fluid being used in the process under a variety of temperature and pressure conditions, the process fluid flowing through a valve controlled in response to a flow rate sensed by the flowmeter and said process fluid being a toxic, reactive, expensive, or difficult to dispose of fluid, or a combination thereof, the flowmeter comprising:

means for sensing fluid flow through a passage by which the process fluid is directed to a process location at which it is used; and, processing means producing an output signal representative of the sensed flow rate of the process fluid, said processing means including means for accessing a calibration curve for the flowmeter to determine the amount of process fluid to be delivered by said fluid flow valve based upon said sensed flow rate and a set point externally established by an operator of the process, said calibration curve being derived from a calibration data set accumulated for the flowmeter over the operational range thereof and using a calibration fluid which is not the process fluid now being controlled by said flowmeter, accessing said data set for said process fluid permitting said flowmeter to condition an output signal generated by the flowmeter so the output signal accurately represents the sensed flow rate of the process fluid so the valve through which the process fluid flows can be accurately controlled to meet the set point requirements of the process even though said process fluid is not the fluid with which the flowmeter is calibrated.

2. The flowmeter of claim 1 further including means for sensing the temperature of the fluid, said processing means being further responsive to the sensed fluid temperature to determine the fluid flow rate for the fluid at the established set point conditions.

3. The flowmeter of claim 2 further including means for sensing the pressure of said fluid, said processing means being further responsive to said sensed pressure to determine the fluid flow rate.

4. The flowmeter of claim 3 wherein said processing means includes memory means in which is stored said data set defining said calibration curve and for said process fluid.

5. The flowmeter of claim 4 which is an analog flowmeter.

6. The flowmeter of claim 4 which is a digital flowmeter.

7. The flowmeter of claim 6 wherein said fluid flow sensing means and said temperature sensing means are analog sensors and said flowmeter further includes analog to digital conversion means for converting the respective analog output of each sensing means to a digital signal.

8. The flowmeter of claim 7 wherein said processor means includes means for processing said digital signal inputs from said respective sensing means and for supplying a digital signal output to a mass flow controller which operates said valve.

9. The flowmeter of claim 8 further including digital communication means for routing said digital signals within said flowmeter and to said mass flow controller.

10. The flowmeter of claim 4 wherein said processor means is a microprocessor and calibration of said flowmeter includes a data base established externally of said flowmeter and in which flow data for said process fluid is maintained for transference to a memory means of said microprocessor for use by said microprocessor in controlling flow of said process fluid.

11. The flowmeter of claim 10 wherein said external data base is capable of storing flow data for a plurality of process fluids, and said microprocessor memory means is capable of storing data sets for more than one process fluid with which said flowmeter can be used.

12. The flowmeter of claim 1 further including a plurality of flowmeters each of which includes a processor means, and communication means for routing digital signals within the flowmeter.

13. A mass flow control system for use in an industrial process in which at least one process fluid is used in producing a product, said process fluids being toxic, reactive, or both, the flow of each process fluid being controlled by a mass flow controller with the process fluids being used under a variety of temperature and pressure conditions, each mass flow controller comprising:

means for sensing fluid flow through a passage by which a process fluid is directed to a process location at which it is used;

valve drive means for operating a fluid flow valve to control the mass flow rate of process fluid into the process based upon the sensed fluid flow rate and the established set point; and control means for controlling said valve drive means and including processor means for accessing a calibration curve for its associated mass flow controller to determine the amount of process fluid to be delivered by said fluid flow valve based upon said sensed flow rate and said set point, said calibration curve being derived from a calibration data set accumulated for the respective mass flow controller over the operational range thereof and using a calibration fluid which is not the process fluid with which said mass flow controller is used in performing the process, said control means accessing said data set for said process fluid and from which said calibration curve for a process fluid is created; and, said system including process controlled means for establishing a set point for each process fluid controlled by a mass flow controller and based upon process temperature and pressure conditions for each respective process fluid.

14. The system of claim 13 wherein each mass flow controller further includes means for sensing the temperature of the fluid with which the mass flow controller is used, said control means for each mass flow controller further being responsive to the sensed fluid temperature to determine the fluid flow rate for the fluid at the established set point conditions.

15. The system of claim 14 wherein each mass flow controller further includes means for sensing the pressure of the fluid with which the mass flow controller is used.

16. The system of claim 15 wherein each mass flow controller is a digital mass flow controller.

17. The system of claim 15 wherein each mass flow controller is an analog mass flow controller.

18. The system of claim 13 further including communication means for connecting said processor means of each mass flow controller to said process control means.

19. An analog mass flow controller for use in a manufacturing process to control the flow of a process fluid used in the process, the process fluid being used under a variety of temperature and pressure conditions and said process fluid being toxic, reactive, or both, and the analog mass flow controller comprising:

means for sensing fluid flow through a passage by which said process fluid is directed to a process location at which it is used and for producing an analog signal representative thereof;

valve drive means for operating a fluid flow valve to control the mass flow rate of said process fluid based upon the sensed fluid flow rate and an established set point for said process fluid; and, control means for controlling said valve drive means, said control means including means for accessing a calibration curve for the mass flow controller to determine the amount of process fluid to be delivered by said fluid flow valve based upon said sensed flow rate and said set point, said calibration curve being derived from a calibration data set accumulated for a representative mass flow controller over the operational range thereof and using a calibration fluid which is not the process fluid now being controlled by said mass flow controller, said control means accessing said data set for said process fluid and from which said calibration curve for the process fluid is created.

20. The analog mass flow controller of claim 19 further including means for sensing the temperature of the process fluid and for producing an analog signal representative thereof, said control means further being responsive to the sensed fluid temperature to determine the fluid flow rate for the process fluid at the established set point conditions.

21. The analog mass flow controller of claim 19 further including means for sensing the pressure of the process fluid, said control means further being responsive to said sensed fluid pressure to determine the fluid flow rate of the process fluid.

22. The analog mass flow controller of claim 21 wherein said control means includes processor means within the mass flow controller for processing fluid flow, fluid temperature and pressure information from the respective sensing means, said processor means including memory means in which is stored said calibration curve and said data set, said data set including a range of flow condition information for the full operating range of the controller.

23. A digital mass flow controller for use in a manufacturing process to control the flow of a fluid used in the process, the process fluid being used under a variety of temperature and pressure conditions and said process fluid being toxic, reactive, or both, and the digital mass flow controller comprising:

means for sensing fluid flow through a passage by which process fluid is directed to a process location at which it is used and for producing an analog signal representative thereof;

means for converting said analog signal from said sensing means to a digital signal;

valve drive means for operating a fluid flow valve to control the flow rate of process fluid into the process based upon the sensed fluid flow rate and an established set point for said process fluid; and, control means responsive to said digital signal from said sensing means for controlling said valve drive means, said control means including means for accessing a calibration curve for the mass flow controller to determine the amount of process fluid to be delivered by said fluid flow valve based upon said sensed flow rate and said set point, said calibration curve being derived from a calibration data set accumulated for the mass flow controller over the operational range thereof and using a calibration fluid which is not the process fluid now being controlled by said mass flow controller, said control means accessing said data set for said process fluid and from which said calibration curve for the process fluid is created.

24. The digital mass flow meter of claim 23 further including:

means for sensing the temperature of the fluid with which the mass flow controller is used and for producing an analog signal representative thereof, and, means for converting said analog signal from said temperature sensing means to a digital signal, said control means being further responsive to the sensed fluid temperature to determine the flow rate for the process fluid at the established set point conditions.

25. The digital mass flow meter of claim 23 further including:

means for sensing the pressure of the fluid with which the mass flow controller is used and for producing an analog signal representative thereof; and, means for converting said analog signal from said pressure sensing means to a digital signal, said control means being further responsive to the sensed fluid pressure to determine the flow rate for the process fluid at the established set point conditions.

26. The digital mass flow controller of claim 25 wherein said control means includes processor means for processing fluid flow, fluid temperature and pressure information from the respective sensing means, said processor means including memory means in which is stored said calibration curve and said data set, said data set including a range of flow condition information for the full operating range of the controller.

27. The digital mass flow controller of claim 26 wherein said valve drive means is responsive to an analog input to open and close said fluid flow valve, and said mass flow controller further includes digital to analog conversion means for converting a digital output signal from said processor means to an analog input signal to said valve drive means.

28. A mass flow controller for use in a manufacturing process for controlling the flow of one of a variety of fluids used in the process, the process fluid controlled by the controller being used in the process under a variety of temperature and pressure conditions and said process fluids possibly being toxic, reactive, expensive, difficult to dispose of, or a combination thereof, the mass flow controller comprising:

means for sensing fluid flow through a passage by which a process fluid is directed to a process location at which it is used;

valve drive means for operating a fluid flow valve to control the mass flow rate of process fluid into the process based upon the sensed fluid flow rate and an established set point for the process fluid; and, control means for controlling said valve drive means, said control means including means for accessing a calibration curve for the mass flow controller to determine the amount of process fluid to be delivered by said fluid flow valve based upon said sensed flow rate and said set point, said calibration curve being derived from a calibration data set accumulated for the mass flow controller over the operational range thereof and using a calibration fluid which is not the process fluid now being controlled by said mass flow controller, said control means accessing said data set for said process fluid and from which the calibration curve for the process fluid is created.

29. The mass flow controller of claim 28 further including means for sensing the temperature of the fluid, said control means being further responsive to the sensed fluid temperature to determine the fluid flow rate for the fluid at the established set point conditions.

30. The mass flow controller of claim 28 further including means for sensing the pressure of the fluid, said control means being further responsive to the sensed fluid pressure to determine the fluid flow rate for the fluid at the established set point conditions.

31. The mass flow controller of claim 30 wherein said control means includes processor means within the mass flow controller for processing fluid flow and fluid temperature and pressure information from the respective sensing means, said processor means including memory means in which is stored said calibration data set for a range of operating conditions.

32. The mass flow controller of claim 31 wherein said mass flow controller is an analog controller.

33. The mass flow controller of claim 31 wherein said mass flow controller is a digital controller.

34. The mass flow controller of claim 33 wherein said fluid flow sensing means and said temperature sensing means are analog sensors and said mass flow controller further includes analog to digital conversion means for converting the respective analog output of each sensing means to a digital signal.

35. The mass flow controller of claim 34 wherein said processor means includes means for processing said digital signal inputs from said respective sensing means and for supplying a digital output to said valve drive means.

36. The mass flow controller of claim 35 wherein said valve drive means is responsive to an analog input to operate said fluid flow valve, and said mass flow controller further includes digital to analog conversion means for converting said digital output signal from said processor means to an analog input signal to said valve drive means.

37. The mass flow controller of claim 31 wherein said processor means is a microprocessor and calibration of said mass flow controller includes a data base established externally of said mass flow controller and in which flow data for said process fluid is maintained.

38. The mass flow controller of claim 37 wherein said external data base is capable of storing flow data for a plurality of process fluids, and said microprocessor memory means is capable of storing data sets for more than one process fluid with which said mass flow controller can be used.

39. The mass flow controller of claim 28 further including communication means routing digital signals within said mass flow controller.

* * * * *

UNITED STATES PATENT AND TRADEMARK OFFICE
CERTIFICATE OF CORRECTION

PATENT NO. : 5,911,238
DATED : June 15, 1999
INVENTOR(S) : Scott S. Bump, et. al.

It is certified that error appears in the above-identified patent and that said Letters Patent is hereby corrected as shown below:

On the title page under [75] inventors, please insert the additional name of the co-inventor therefor.

William W. White; Sparks, Nv.

Signed and Sealed this

Fourteenth Day of December, 1999

Attest:

Q. TODD DICKINSON

Attesting Officer

Acting Commissioner of Patents and Trademarks